United States Patent [19]
Seul

[11] Patent Number: 6,097,004
[45] Date of Patent: Aug. 1, 2000

[54] MULTIPURPOSE PAN

[76] Inventor: Yong-Seuk Seul, 532-11, Ssangmun 1-dong, Dobong-ku, Seoul, Rep. of Korea

[21] Appl. No.: 09/316,113

[22] Filed: May 20, 1999

[30] Foreign Application Priority Data

May 23, 1998 [KR]  Rep. of Korea .................... 98/18665

[51] Int. Cl.⁷ .............................. F27D 11/00; H05B 3/68
[52] U.S. Cl. ........................................ 219/438; 219/450.1
[58] Field of Search ...................... 219/438, 439, 219/432, 436, 443.1, 450.1, 451.1, 455.11, 461.1, 467.1, 524; 99/375, 377, 378, 393, 422, 425, 444, 445

[56] References Cited

U.S. PATENT DOCUMENTS

| | | | |
|---|---|---|---|
| 1,711,472 | 4/1929 | Lewin | 219/450.1 |
| 2,362,757 | 11/1944 | Lang | 219/450.1 |
| 2,715,173 | 8/1955 | Farquaharson | 219/450.1 |
| 3,130,664 | 4/1964 | Jarmuth et al. | 99/425 |
| 3,317,709 | 5/1967 | Beasley | 219/450.1 |
| 3,714,885 | 2/1973 | Wertheimer et al. | 99/425 |
| 3,842,726 | 10/1974 | Fautz | 99/425 |
| 5,845,562 | 12/1998 | Deni et al. | 99/375 |

FOREIGN PATENT DOCUMENTS 0144507   2/1999   Rep. of Korea .

*Primary Examiner*—Sang Paik
*Attorney, Agent, or Firm*—Finnegan, Henderson, Farabow, Garrett & Dunner, L.L.P.

[57] ABSTRACT

A multipurpose pan includes a plurality of supports mounted on an inner bottom side of a housing and a heating plate mounted on the supports. The heating plate is made of stone or metal and includes a recess on its outer bottom side for mounting on the heater. A supporting body is inserted in an opening bored on a center of the heating plate and a double sided broiler plate is mounted on the heating plate. The double-sided broiler plate includes an oil outlet bored proximate to the broiler plate's peripheral surface. A lid covers the housing.

3 Claims, 2 Drawing Sheets

MULTIPURPOSE PAN

BACKGROUND OF THE INVENTION

1. Technical Field

The present invention relates to a pan for a pizza, meat, etc., and more particularly, to a multipurpose pan for improving taste by indirectly heating a double-sided broiler plate, instead of heating it directly.

2. Description of the Related Art

A conventional electric pan has a relatively thin bottom side, and therefore, if a heater contacting the pan bottom heats, pan temperature abruptly rises, while, if lowering pan temperature, the temperature descends rapidly. So, it is very difficult to control temperature suitable to every food items, e.g., pizza, meat, etc.

To solve the problem, the applicant developed a pan (Korean Utility Model Application No. 1996-40787), in which double-sided broiler plate made of a regular thickness stone plate was directly mounted on a heater. Thus, taste of food could be improved compared with the conventional pan.

However, because the double-sided broiler plate made of a stone was so heavy that it was inconvenient to alternate the double-sided broiler plate according to the necessary food item or to move the double-sided broiler plate to clean it after use.

In addition, an oil receiver having a handle is slidably inserted to a base part of a housing of an electric pan to receive oil created when roasting meat. However, since the handle is hidden by a housing body, it is inconvenient to draw the oil receiver.

Further, the electric pan has an oil outlet, which is bored in a central part, for exhausting oil created when roasting meat. Therefore, since a user habitually put meats on a central part of a pan, the oil outlet may be blocked and so the oil cannot be exhausted to the oil receiver.

SUMMARY OF THE INVENTION

Accordingly, it is an object of the present invention to provide a multipurpose pan which heats a food indirectly via a heating plate, so that the food can be cooked slowly and is prevented from being burnt or partially cooked, thereby improving the taste of the cooked food.

It is another object of the present invention to provide a multipurpose pan of which one side of a double-sided broiler plate forms a slant to guide the oil created from a roasted meat to a periphery of the double-sided broiler plate.

It is yet another object of the present invention to provide a multipurpose pan, in which a handle of an oil receiver can be slidably inserted to a handle of a housing when installing the oil receiver in the housing, thereby easily inserting and drawing the oil receiver.

BRIEF DESCRIPTION OF THE DRAWINGS

The above and the other objects and features of the present invention will become apparent from the following description given in conjunction with the accompanying drawings, in which.

DETAILED DESCRIPTION OF THE PREFERRED EMBODIMENT

Figure 1:
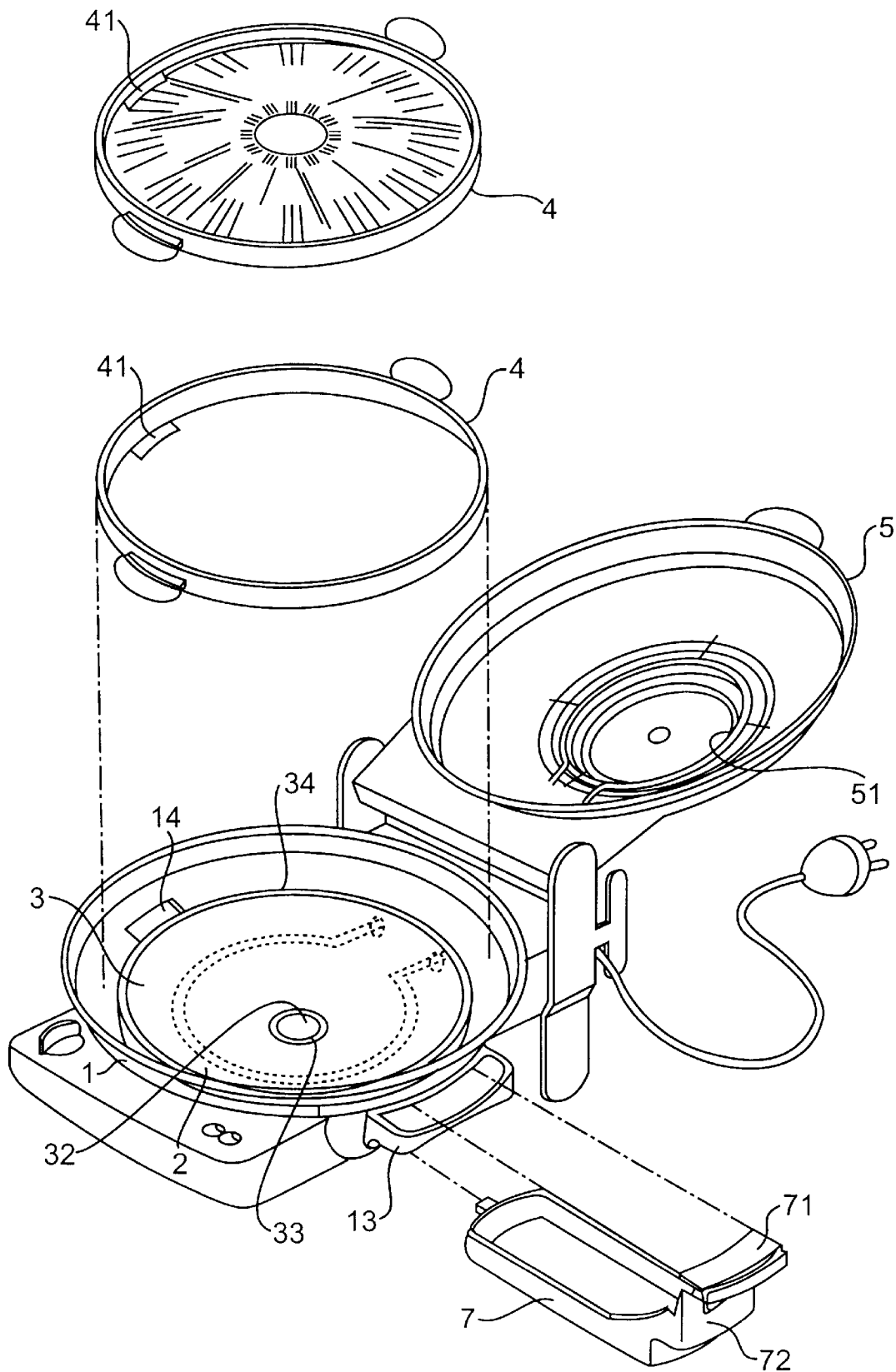
FIG. 1 is a perspective view showing a pan according to one embodiment of the present invention.

Hereafter, the construction of the present invention to achieve the above objects will be explained with reference to the attached drawings.

A multipurpose pan according to the present invention is composed of a plurality of supports 11 which are mounted on an inner bottom side of a housing 1; a heater 2 secured by the supports 11; a heating plate 3 which is made of a stone plate or a metal plate and has a recess 31 on its outer bottom side to being safely mounted on the heater 2; a supporting body 33 which is inserted in an opening 32 bored on a center of the heating plate 3; a double-sided broiler plate 4 which is mounted on the heating plate 3 and has an oil outlet 41 bored on the peripheral part of it; and a lid 5 which covers the housing 1. In the above, the heating plate 3 is mounted on the housing 1 by fixing the supporting body 33 to a protrusion 12 formed on the housing 1 via a fixing member 6.

Alternatively, from the above construction, it is possible that a broiler plate 40 made of a stone or a metal is built in the housing 1, and the heater 2 is directly contacted to the bottom of the broiler plate 40.

According to the present invention, an insertion groove 72 formed on a handle 71 of an oil receiver 7, which is slidably installed under the housing 1 to receive an oil from a roasted food, is slidably inserted to a handle 13 of the housing 1.

The operation of the present invention will be described more in detail.

Figure 2:
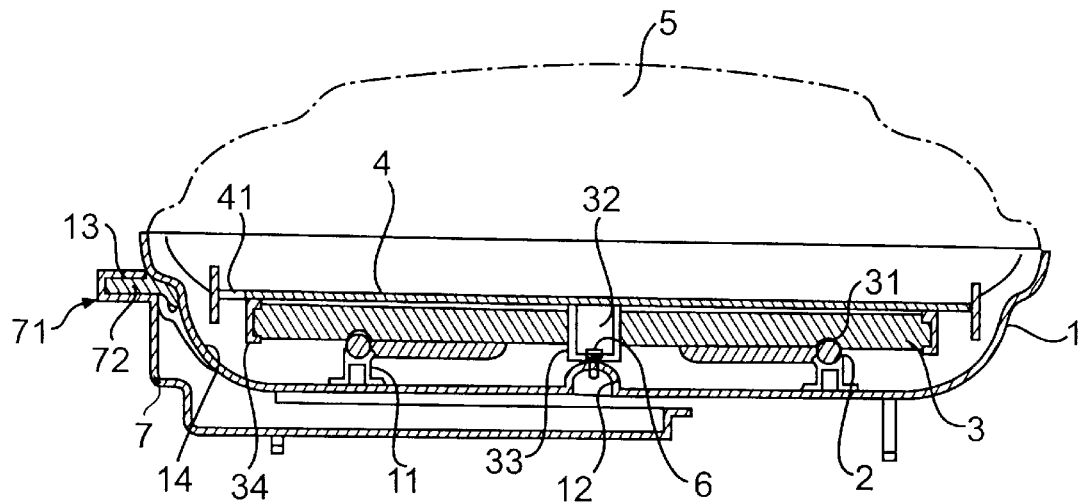
FIG. 2 is a cross sectional view showing a pan according to the above embodiment.

FIG. 1 is an exploded perspective view showing a multipurpose pan according to the present invention, and FIG. 2 is a cross sectional view showing a multipurpose pan with the lid closed. As shown, a multipurpose pan of the present invention has mechanical stability by securing the heater 2 on the housing 1 via the supports 11, contrary to the pan that has been patent applied by the Applicant before.

In addition, on the heater 2, the heating plate 3 is newly added, which transfers heat from the heater to the double-sided broiler plate 4. The heating plate 3 is firmly fixed to the housing 1, by inserting the heater wire into the recess 31 of the heating plate 3. Further, in order to completely fix the heating plate 3 to the housing 1, the fixing member 6 fixes the supporting body 31, which is inserted into the opening 32 formed on the center of the heating plate 3, to the protrusion 12, which is projected from the bottom of the housing 1.

To smoothly exhaust the oil created from the cooked food, the oil cutlet 41 is bored on the periphery, rather than on the central part, of the double-sided broiler plate 4. Thus, the exhausted oil through the oil outlet 41 is received in the oil receiver 7, passing through the opening 14 bored on the periphery of the housing 1.

Contrary to the conventional pan, in the present invention, the handle 71 of the oil receiver 7 is exposed outside, because an insertion groove 72 formed on the handle 71 of the oil receiver 7 is slidably inserted to the handle 13 of the housing 1. Therefore, the oil gathering in the oil receiver 7 can be removed simply by pulling the handle 71, which is exposed outside, of the oil receiver 7 outside. That is, because the handle 71 of the oil receiver 7 is exposed outside the housing 1 and inserted in the handle of the housing, the oil receiver can be easily drawn.

In the present invention, the food is cooked on the double-sided broiler plate 4 mounted on the heating plate 3 on the heater 2 supported by the supports 11. That is, instead of transferring heat from the heater 2 directly to the double-sided broiler plate 4, the pan of the present invention transfers heat from the heater 2 to the double-sided broiler plate 4, indirectly through the heating plate 3. Thereby, food on the double-sided broiler plate 4 can be heated evenly and the taste can be improved.

The heating plate 3 is mounted on the heater 2 by combining the heater 2 with the recess 31 formed on the bottom of the heating plate 3. The heating plate 3 is further fixed to the inside of the housing 1, by fixing via the fixing member the supporting body 33, inserted into the opening 33, to the protrusion 12 of the housing 1. In addition, a steel strap 34 envelopes along the circumference of the heating plate 3 in order to prevent the edge of heating plate 3 made of a stone or a metal being damaged.

The double-sided broiler plate 4 is made of a stone plate or a metal plate and its both sides are available. For example, one side is for cooking a pizza, the other side is for roasting meat. The face for roasting meat declines to the oil outlet 41 centering the center of the double-sided broiler plate (4) to guide the oil to the oil outlet 41.

Likes in the conventional pan, a heater 51 is installed inside of the lid 5, and therefore, heat is applied to the food from both upper and lower sides.

In addition, if the double-sided broiler plate 4 is broken, it can be independently replaced by a new replacement spare. That is, by unfastening the supporting body 33 from the protrusion 12, the broken double-sided broiler plate 4 can be replaced with new one.

Figure 3:
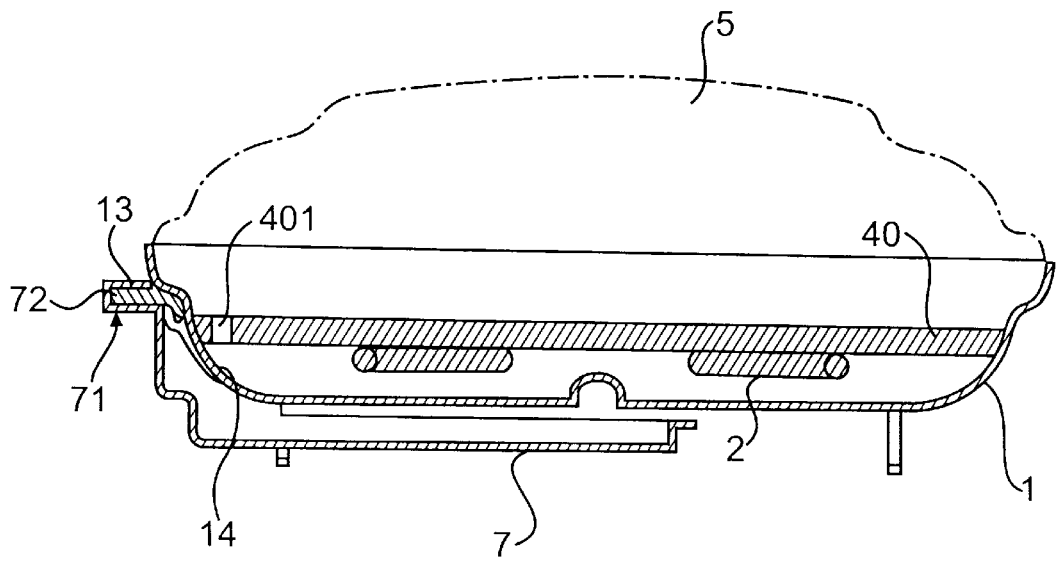
FIG. 3 is a cross sectional view showing a pan according to another embodiment of the present invention.

In a second embodiment of the present invention illustrated by FIG. 3, the broiler plate 40 is adapted. The broiler plate 40 is united in the housing 1 as one body and the heater 2 is directly attached beneath the bottom of the broiler plate 40, and thus, heat from the heater 2 is transferred to the broiler plate 40.

By doing so, it gives convenience to a cooker, since he or she is not necessary to replace or move the broiler plate 40 when cooking.

Meanwhile, at one edge of the broiler plate 40, an oil outlet 101 for exhausting the oil created when cooking food is provided. Of course, like in the first embodiment, the handle 71 of the oil receiver 7 is slidably inserted to the handle 13 of the housing in this embodiment.

From the foregoing, because the double-sided broiler plate is not directly heated, food on it cannot be burnt and can be slowly cooked, thereby improving the taste of food. In addition, because the handle of the oil receiver is exposed outside the housing, the oil receiver can be easily drawn to remove the oil in it.

Although the present invention has been described in considerable detail with reference to certain preferred versions thereof, other versions are possible. For example, depending on the food item, it is possible to apply a broiler plate 40 having no oil exhaust 401, and at this time, there is not necessity of an oil receiver 7. Therefore, the spirit and scope of the appended claims should not be limited to the description of the preferred versions contained herein.

What is claimed is:

1. A multipurpose pan comprising:

a plurality of supports which are mounted on an inner bottom side of a housing;

a heater secured by the supports;

a heating plate which is made of a stone plate or a metal plate and has a recess on its outer bottom side to being safely mounted on the heater;

a supporting body which is inserted in an opening bored on a center of the heating plate;

a double-sided broiler plate which is mounted on the heating plate and has an oil outlet bored proximate a peripheral edge of the plate; and a lid which covers the housing, the heating plate being mounted on the housing by fixing the supporting body to a protrusion formed on the housing via a fixing member.

2. A multipurpose pan according to claim 1, wherein an insertion groove formed on a handle of an oil receiver, which is slidably installed under the housing to receive an oil from a roasted food, is slidably inserted to a handle of the housing.

3. A multipurpose pan comprising:

a plurality of supports which are mounted on an inner bottom side of a housing;

a heater secured by the supports;

a broiler plate made of stone or metal having an outer bottom side mounted on the heater, said broiler plate built in and supported by the housing and having an oil outlet bored proximate a peripheral edge of the plate; and a lid covering the housing.

* * * * *